(12) United States Patent
Hottinen

(10) Patent No.: US 8,059,577 B2
(45) Date of Patent: Nov. 15, 2011

(54) APPARATUS, METHOD AND COMPUTER PROGRAM PRODUCT PROVIDING SUB-CHANNEL ASSIGNMENT FOR RELAY NODE

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 1253 days.

(21) Appl. No.: 11/592,102

(22) Filed: Nov. 1, 2006

(65) Prior Publication Data

US 2007/0098102 A1    May 3, 2007

Related U.S. Application Data

(60) Provisional application No. 60/733,136, filed on Nov. 2, 2005.

(51) Int. Cl.
*H04B 7/14* (2006.01)
(52) U.S. Cl. ...................................................... 370/315
(58) Field of Classification Search .................. None
See application file for complete search history.

(56) References Cited

U.S. PATENT DOCUMENTS

| 6,377,566 B1 * | 4/2002 | Cupo et al. ...................... 370/343 |
| 7,639,639 B2 * | 12/2009 | Herdin ........................... 370/315 |
| 2004/0266339 A1 | 12/2004 | Larsson ............................. 455/7 |
| 2005/0014464 A1 | 1/2005 | Larsson ......................... 455/11.1 |
| 2007/0053457 A1 * | 3/2007 | Sakoda ........................... 375/260 |

OTHER PUBLICATIONS

"Power Allocation for Non-regenerative OFDM Relaying Channels", Yu Guan-ding, et al., IEEE 2005, pp. 185-188.
"Joint Cooperative Diversity and Scheduling in Low Mobility Wireless Networks", Armin Wittneben, et al., IEEE Global Telecommunications Conference, Globecom 2004, Nov. 2004, 5 pages.
"Channel Adaptive Scheduling for Cooperative Relay Networks", Ingmar Hammerstrom et al., IEEE Vehicular Technology Conference, VTC Fall 2004, Sep. 2004, 5 pages.
"Cooperative Diversity by Relay Phase Rotations in Block Fading Environments", Ingmar Hammerstrom et al., IEEE SPAWC 2004, Jul. 2004, 5 pages.

(Continued)

*Primary Examiner* — Anh-Vu Ly
(74) *Attorney, Agent, or Firm* — Harrington & Smith, LLC

(57) ABSTRACT

Disclosed herein are apparatus, methods and computer program products providing sub-channel re-assignment performed by a relay node in a wireless communications system. In the apparatus, methods and computer program products, a relay receives an input signal made up of a plurality of sub-channels. The relay de-multiplexes the sub-channels into a plurality of signal streams, and reassigns at least one of the signal streams to a new sub-channel on the output side, the new sub-channel on the output side different from the sub-channel originally containing the signal stream on the input side. In one embodiment of the invention, the wireless communications system is an OFDM system and the sub-channels correspond to OFDM sub-carriers. In another embodiment of the invention, during sub-channel reassignment input sub-channels are matched to output sub-channels sharing a pre-determined criterion.

44 Claims, 4 Drawing Sheets

OTHER PUBLICATIONS

"Broadband MIMO-OFSM Wireless Communications", Gordon L. Stuber et al., IEEE, vol. 92, No. 2, Feb. 2004, pp. 271-294.

Serbetli, Semih et al., "Optimal Power Allocation for Relay Assisted F/TDMA Ad Hoc Networks", Wireless Networks, Communications and Mobile Computing, 2005 International Conference on, vol. 2, pp. 1319-1324, Jun. 13-16, 2005.

Li, Guoqing et al., "On the Capacity of Broadband Relay Networks", Signals, Systems and Computers, 2004, Conference Record of the Thirty-Eighth Asilomar Conference on, vol. 2, pp. 1318-13322, Nov. 7-10, 2004.

Laneman, J. Nicholas et al., "Cooperative Diversity in Wireless Networks; Efficient Protocols and Outage Behavior", Information Theory, IEEE Transactions on, vol. 50, pp. 3062-3080, Dec. 2004.

Hottinen, Ari et al., "Subchannel Assignment in OFDM Relay Nodes", Information Sciences and Systems, 2006 40th Annual Conference on, pp. 1314-1317, Mar. 2006.

* cited by examiner

APPARATUS, METHOD AND COMPUTER PROGRAM PRODUCT PROVIDING SUB-CHANNEL ASSIGNMENT FOR RELAY NODE

CLAIM OF PRIORITY FROM A COPENDING PROVISIONAL PATENT APPLICATION

Priority is herewith claimed under 35 U.S.C. §119(e) from co-pending Provisional Patent Application 60/733,136, filed on Nov. 2, 2005 by Ari Hottinen entitled "APPARATUS, METHOD AND COMPUTER PROGRAM PRODUCT PROVIDING SUB-CHANNEL ASSIGNMENT FOR RELAY NODE". The disclosure of this Provisional Patent Application is hereby incorporated by reference in its entirety as if fully restated herein.

TECHNICAL FIELD

The exemplary and non-limiting embodiments of this invention relate generally to wireless communications systems such as, but not limited to, code division multiple access (CDMA), wideband CDMA (WCDMA), orthogonal frequency division multiplex (OFDM) systems and Digital Video Broadcast (DVB) systems, including handheld DVB systems (DVB-H).

BACKGROUND

Collaborative relays may be used as "new network elements" or as "transparent network elements". When used as new network elements it is likely that signaling concepts and/or resource allocation concepts need to be at least partially redefined. In contrast, transparent relay nodes may be (ideally) placed in the wireless network so that they increase the network capacity in such a way that (ideally) the network (or terminals) is unaware of their existence.

One transparent solution may utilize in-band relaying, where at least in part the same frequency is used at the relay input and relay output at essentially the same time. In this case the relay nodes may be added to a wireless system without the need to redesign the base station (transmitter) or the terminals. In such a system the loop interference in amplify and forward relays may be controlled by reducing the relay transmit energy, as perceived at the relay node input. This may be accomplished by separating the receive antennas and transmit antennas from each other (physically or via beamforming). This type of relaying approach is currently being used in DVB-H (test) networks. In addition to DVB-H, this concept is applicable as an add-on feature to prevailing wireless systems, such as WCDMA, or in various OFDM-based systems.

Two-hop solutions have been discussed by A. Wittneben, I. Hammerstroem, and M. Kuhn, "Joint Cooperative Diversity and Scheduling in Low Mobility Wireless Networks," *IEEE Global Telecommunications Conference, Globecom* 2004, November 2004; I. Hammerstroem, M. Kuhn, and A. Wittneben, "Channel Adaptive Scheduling for Cooperative Relay Networks," *IEEE Vehicular Technology Conference, VTCFall* 2004, Los Angeles, September 2004 and I. Hammerstroem, M. Kuhn, and A. Wittneben, "Cooperative Diversity by Relay Phase Rotations in Block Fading Environments," *Signal Processing Advances in Wireless Communications, SPAWC* 2004, pp. 5, July 2004. In these publications different time slots are used at the relay for reception and transmission.

Of more interest to the teachings of this invention are relay or mesh networks that are under investigation for wireless Local Area Network (LAN) systems and WiMax systems and, in particular, for fourth generation (4G) wireless communications systems. In these cases relays are used to increase system capacity or range without the need to invest a large number of antennas in each individual transmitter unit.

However, a problem exists that is related to the control of sub-channels at relay nodes in wireless networks. For example, if the relay is configured to retransmit a multi-carrier or OFDM input signal, and the channel nulls in relay input and output are all at different subcarriers, the channel power at the destination is zero for each subcarrier.

Typically, channel assignment is not done at the relay nodes. In particular, channel assignment where the assignment depends on either the input or output channels is proposed here.

SUMMARY OF THE INVENTION

A first embodiment of the invention is a method for reassigning at least one signal stream contained in an input subchannel received at a relay node to a different subchannel for retransmission. In the method, an input of a relay node in a communications system receives a signal, where the signal comprises a plurality of subchannels. The relay node demultiplexes the subchannels comprising the signal into a plurality of separate signal streams. The relay node then reassigns at least one signal stream originally contained in a first subchannel received at the input of the relay node to a second subchannel for the purpose of transmission, where the first subchannel is different from the second subchannel. The relay node next transmits the reassigned signal stream in an output signal comprising at least the second subchannel.

A second embodiment of the invention is a relay node comprising a receiver configured to receive an input signal comprised of a plurality of subchannels; a transmitter configured to transmit an output signal comprised of a plurality of subchannels; and circuitry coupled to the receiver and transmitter. The circuitry further comprises demultiplexing circuitry configured to demultiplex the subchannels comprising the input signal into a plurality of separate signal streams; reassignment circuitry configured to reassign at least one signal stream originally contained in a first subchannel received at the relay node to a second subchannel for the purpose of transmission; and transmission control circuitry configured to cause the transmitter to transmit the output signal, the output signal comprising at least the second subchannel containing the reassigned signal stream.

A third embodiment of the invention is relay node comprising receiver means for receiving an input signal comprised of a plurality of subchannels; transmitter means for transmitting an output signal comprised of a plurality of subchannels; and signal processing means coupled to the receiver means and the transmitter means. The signal processing means further comprises demultiplexing means for demultiplexing the subchannels comprising the input signal into a plurality of separate signal streams; reassignment means for reassigning at least one signal stream originally contained in a first subchannel received at the relay node to a second subchannel for the purpose of transmission; and transmission control means for causing the transmitter means to transmit the output signal, the output signal comprising at least the second subchannel containing the reassigned signal stream.

A fourth embodiment of the invention is a computer program product comprising a memory medium tangibly embodying a program of machine-readable instructions executable by a digital processing apparatus of a computer system. When the program of machine-readable instructions is executed by the digital processing apparatus, operations are performed, the operations comprising: receiving an input signal comprised of a plurality of subchannels; demultiplexing the subchannels creating a plurality of separate signal streams; reassigning at least one signal stream originally contained in a first subchannel to a second subchannel for the purpose of transmission, wherein the first subchannel is different from the second sub-channel; and issuing a command to transmit an output signal comprising at least the second subchannel containing the reassigned signal stream.

A fifth embodiment of the invention is method for reassigning signal streams at a plurality of relay nodes in a wireless communications system. In the method, a signal is transmitted from relay node to relay node in sequence. At each relay node in the sequence, the relay node receives an input signal, the input signal comprising a plurality of subchannels, each subchannel carrying a signal stream; the relay node then reassigns at least one signal stream originally contained in a first subchannel received at the input of the relay node to a second subchannel for the purpose of transmission, where the first subchannel is different from the second subchannel; and next the relay node transmits an output signal, the output signal comprising at least the second subchannel containing the reassigned signal stream.

BRIEF DESCRIPTION OF THE DRAWINGS

In the attached Drawing Figures.

DETAILED DESCRIPTION

As was noted, typically the channel assignment is not done at the relay nodes. An exemplary aspect of this invention is to perform channel assignment at a relay node, where the assignment depends on either the input or output channels.

Related to the problem identified above, by reassigning useful input subcarriers to useful output subcarriers a relay is able to improve performance. Without the use of the exemplary embodiments of this invention, and in the special case given above, the relay would only transmit noise, and system capacity would deteriorate drastically.

As will be made apparent below, the exemplary embodiments of this invention provide methods, apparatus and a computer program product operable to increase the performance of wireless systems that contain at least one relay node with multiple sub-channels at the relay node input and relay node output. According to one exemplary embodiment the relay node demultiplexes the input sub-channels (e.g., OFDM subcarriers) and reassigns a symbol or other signal stream in at least one input sub-channel to another output sub-channel before transmission, where the transmission sub-channel is different from the input sub-channel. Furthermore, the relay node may use channel information at the relay input or output for optimizing the channel reassignment and other resource allocation tasks such as, but not limited to, power/rate/transport format allocation for sub-channels.

Figure 1A:
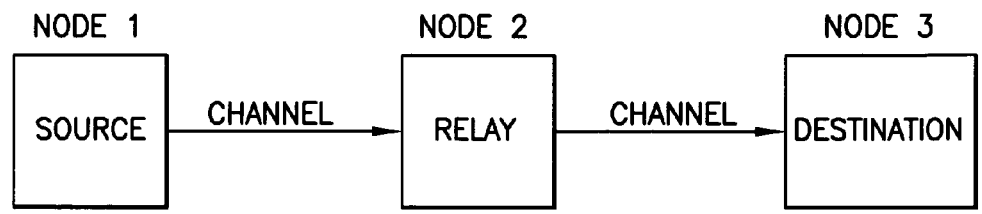
FIG. 1A shows a simplified three node network.
Figure 1B:
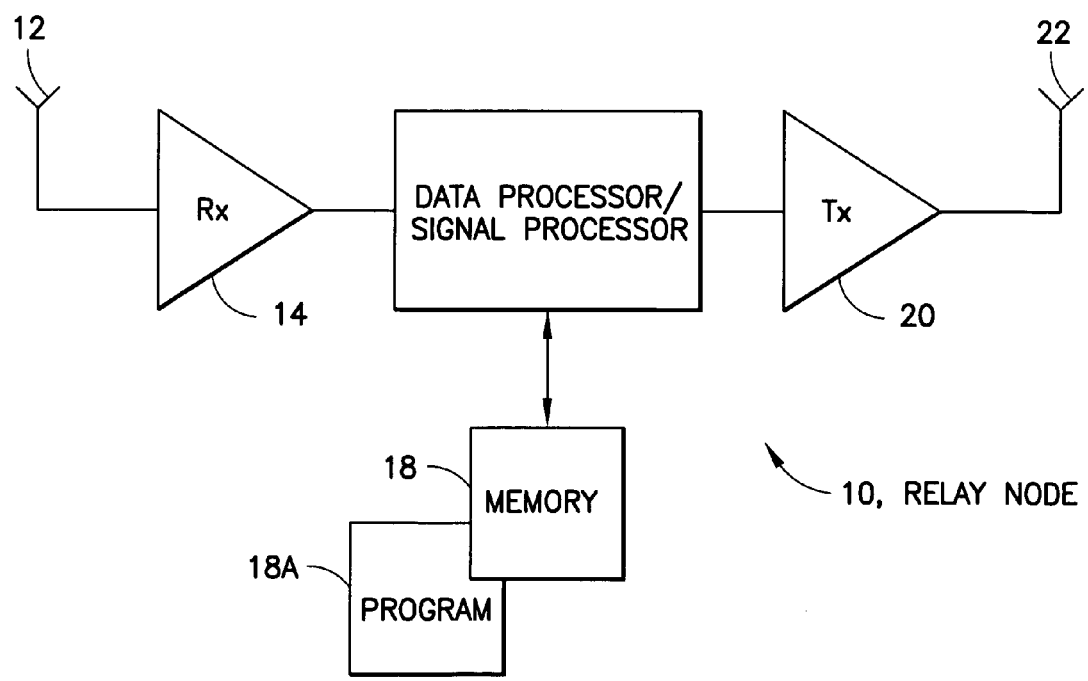
FIG. 1B is a simplified block diagram of a relay node in accordance with the non-limiting embodiments of the invention.

Reference is made first to FIGS. 1A and 1B for illustrating a simplified block diagrams various electronic devices that are suitable for use in practicing the exemplary embodiments of this invention.

Consider, as an example, a two hop relaying concept where the signal is received and transmitted at the relay at different times. Assume that the signal format is such that there are multiple sub-channels for which the effective channel is different. The sub-channels may be, e.g., OFDM subcarriers.

In such a system, assume that a network that has a source node (Node 1) a relay node (Node 2) and a destination node (Node 3), as shown in FIG. 1A. FIG. 1B shows an example of a relay node (Node 2) of FIG. 1A. The relay node (referenced as relay node 10 for convenience) includes at least one receive antenna 12, at least one receiver 14, a data and/or signal processor 16, such as a digital signal processor (DSP), a memory 18, wherein program code (18A) is stored for operating the processor 16, at least one transmitter 20 and at least one transmit antenna 22. It may be noted that the source Node 1 may be constructed in a somewhat similar manner, and will include at least the at least one transmitter 20 and transmit antenna(s) 22, and the destination Node 3 may also be constructed in a somewhat similar manner, and will include at least the receive antenna(s) 12 and the at least one receiver 14.

The memory 18 may be of any type suitable to the local technical environment and may be implemented using any suitable data storage technology, such as semiconductor-based memory devices, magnetic memory devices and systems, optical memory devices and systems, fixed memory and removable memory. The data processor 16 may be of any type suitable to the local technical environment, and may include one or more of general purpose computers, special purpose computers, microprocessors, digital signal processors (DSPs) and processors based on multi-core processor architecture, as non-limiting examples.

Still referring to FIG. 1A, consider an amplify and forward (non-regenerative) relay network where the received signal at Node 3 is $$y[p]=h_{23}[p](h_{12}[p']x+n_2[p'])+n_3[p] \quad (1)$$

where $h_{kl}[p]$ is the effective complex channel between Node k and Node 1 for sub-channel p, and $n_k$ is the noise at the receiver of Node k.

In an OFDM network the different sub-channels typically correspond to different OFDM subcarriers or clusters of subcarriers. In single-carrier modulation systems the different sub-channels may be symbols arriving at the relay node 10 at different times. In a CDMA system the sub-channels may correspond to different channelization codes at the same or different carrier frequencies. Combinations of different types of subchannels are also possible.

The received signal power may be computed to be:

$$\text{Signal Power}[p, p']=|h_{12}[p']h_{23}[p]|^2 \quad (2)$$

and noise power for the amplify and forward relay example as:

$$\text{Noise Power}=1+|h_{23}[p']|^2 \quad (3)$$

assuming (for simplicity, and without limiting to such a case) that all receivers have noise power one. The signal-to-noise ratio at Node 3 for a pair of sub-channels is $$SINR[p, p'] = \frac{\text{Signal Power}[p, p']}{\text{Noise Power}} \quad (4)$$

Channel Reassignment

It should be apparent that if either $h_{12}[p']$ or $h_{23}[p]$ is zero (or has a small channel gain) for all assigned pairs $(p,p^N)$ then the effective channel is also poor. Typically, both are not poor simultaneously but nevertheless a fixed mapping where p=p' may lead to performance degradation. This is undesirable, as it is generally desirable to combine sub-channels of similar power.

In accordance with an exemplary embodiment of the invention, one technique to accomplish this (approximately) is to sort the input and output sub-channels in increasing order and combine the strongest, second strongest, etc., sub-channels with each other. The number of sub-channels paired in this way may be controllable, so that very poor sub-channels in either the relay output or input are not necessarily used for the given connection. This method has the benefit that computations at the relay node are made simple, essentially related to ranking of channel powers or other related performance measures, such as signal-to-noise ratios, channel capacities (e.g., $\log_2(1+\text{SNR})$, or mutual information. Similarly, the relay node may assess or estimate the probability of input and output channels, or their respective pairing, and determine the set pairing (or more than one pairing) that minimizes the probability of error. This minimization can be computed for one individual pairing or for a number of sub-channel pairings, e.g. so that the average error probability is minimized. Here, as above, sub-channels with similar rank are paired with each other.

Further in accordance with exemplary embodiments of this invention, another technique is to find the optimal assignment using an optimization technique, as is described below.

An optimal assignment is found by solving an assignment problem. For notational convenience, define $c_{p,p'}$ as equation (5), $$c_{p,p'} \doteq \text{SINR}[p,p'], \forall p,p' \quad (5)$$

where $c_{p,p'}$ designates the 'utility' in assigning input sub-channel p to output sub-channel p', which are captured in matrix $C=[c_{p,p'}]$. The assignment problem for maximizing the total received signal power is posed as $$\max \sum_p \sum_m c_{p,p'} x_{p,p'} \quad (6)$$

subject to the conditions shown in the expressions of equations (7), (8) and (9), respectively.

$$\sum_p x_{p,p'} = 1, \forall p' \quad (7)$$

$$\sum_p x_{p,p'} = 1, \forall p \quad (8)$$

$$x_{p,p'} \geq 0, \forall p, p' \quad (9)$$

The optimal solution is known to be integral, where $x_{p,p'} \in \{0,1\}$ where $x_{p,p'}=1$ if pair (p,p') is assigned and $x_{p,p'}=0$ otherwise.

The constraints thus formalize the requirement that each input sub-channel is assigned to exactly one output sub-channel, and that all sub-channels are assigned. These constraints may naturally be relaxed. Furthermore, the function $c_{p,p'}$ is an arbitrary function that measures the effect of the given assignment to the selected performance or quality measure.

Example for OFDM systems

Let F denote a P×P fast inverse Fourier transform (IFFT) matrix, where $[F]_{p,q}=1/\sqrt{P}\exp(j2\pi(p-1)(q-1)/P)$. The corresponding FFT (FFT) matrix, applied at the OFDM receiver, is given by $F^\dagger$, the Hermitean conjugate of $F$. Assume that the signal is transmitted through a finite impulse response (FIR) channel of length L and that a cyclic prefix of length $L_c > L$ is used at the transmitter. Then, after removing the cyclic prefix and correlating with the FFT matrix, the effective signal model at the receiver is given by:

$$y = F^\dagger HFx + n \quad (10)$$

where H denotes a circulant convolution matrix with entries $$[H]_{p,q} = h((p-q) \bmod P),$$

where h(l) designates the l th temporal channel tap. Vector x represents the symbol vector and n the complex Gaussian noise. Since FFT diagonalizes a circulant matrix, the model can be written also as $$y = Dx + n \quad (11)$$

where D=diag (H(O), ..., H(P−1),
with H(p) as shown in equation (12):

$$H(p) = \Sigma_{l=0}^L h(L)\exp(-j2\pi lp/P) \quad (12)$$

The concise model given above is known, and reference may be made to G. Stüber, J. B. Barry, S. W. McLaughlin, Y. Li, M. A. Ingram and T. G. Pratt, "Broadband MIMO-OFDM wireless communications," Proc. IEEE, Vol. 92, No. 2, February 2004, pp. 271-294 for additional details.

A similar model applies to the channel from the relay node 10 to the destination node (Node 3 in FIG. 1A). With amplify and forward relaying the vector x is replaced by functions similar to those found in Equations 1 or 11, with decode and forward relays each element of x is a signal estimate. In order to form the estimates for the each relayed subcarrier the relay 10 needs to perform the FFT operation. With amplify and forward relays the relayed SNR is thus taken from the FFT bins at the relay node 10. The channel from the relay node 10 to the destination node (Node 3) may be arbitrary (different or same carrier frequency), possibly using a different block transmission method from that used to transmit to the relay node 10.

As a special case, with amplify and forward relays the effective signal received at destination (assuming only one relay) is:

$$Y_2 = F^{55}H_2Fy + n_2 \quad (11)$$

where $H_2$ refers to the channel from the relay node to the destination node, and $y_2$ the signal received at destination node, and P is a permutation matrix. Power and rate control at the relay node 10 is omitted here for simplicity. The permutation matrix P associates subcarriers p and p' to each other so that pth row of P has number one at the p'th column, and zeros elsewhere. While there are P! permutation matrices to test, the assignment algorithm given above reduces the search to polynomial complexity.

The exemplary embodiments of this invention exploit the fact that the different permutation matrices (used at the relay node 10) lead to enhanced performance at the destination (Node 3), and that the permutation may be computed in a cost efficient manner. When performance is to be optimized the relay node 10 uses at least partial channel knowledge of either the input or the output channel, or the prevailing interference power or statistics at the destination or the relay 10. Interference information may be signaled from the next-hop receiver (and may indicate, for example, which subcarriers are usable), or the information may be derived at the relay 10.

If the relay node 10 changes the channel assignment, it may be desirable that the new assignment (or information related to the new assignment) is signaled to the destination node. If not, the destination may need to blindly detect the sub-channel ordering. To minimize the signaling load, the sub-channels may be reassigned in bundles (e.g., by always having eight neighboring subcarriers assigned with the same assignment), in which case only the sub-channel bundle indices need to be signaled.

Figure 2:
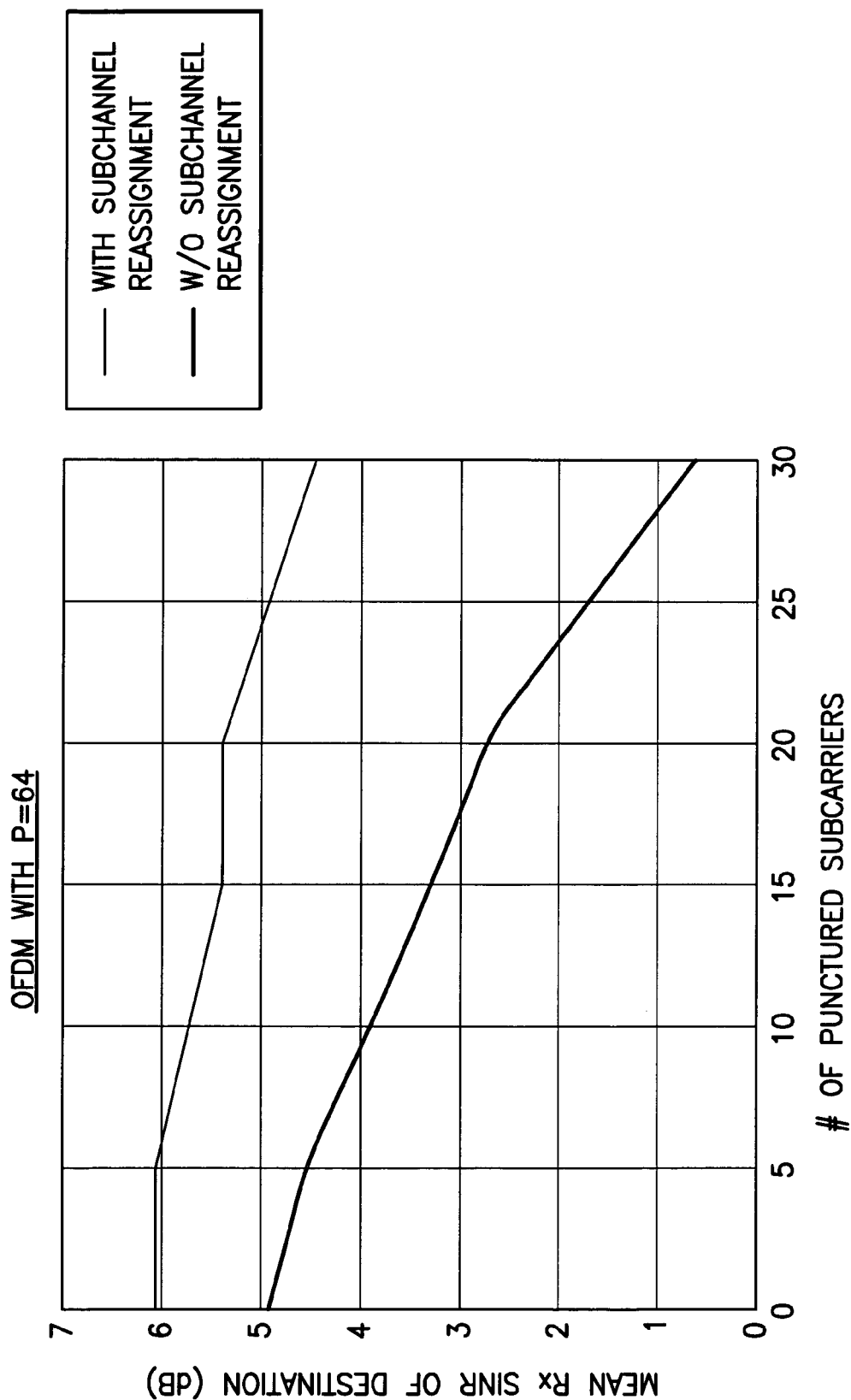
FIG. 2 is a graph depicting exemplary relaying performance with and without channel reassignment with 64 subcarriers in a 4-path channel.

To appreciate the benefits derived from the use of the exemplary embodiments of this invention a numerical example is provided. Assume as a non-limiting case that the input and output channels at the relay node 10 have four taps, and 64 subcarriers are used. No channel bundling is used and all subcarriers may need to be reassigned. FIG. 2 shows the performance with and without subcarrier assignment, as a function of usable subcarriers. It is assumed that 0-30 subcarriers may be unusable if those channels are already occupied, or if the receiver experiences very high power narrowband fading at a given subcarrier (e.g. due to a contention-based protocol or due to jamming). In this case, both concepts put all power to the remaining subcarriers, but the method of this invention may in addition change the subcarrier indices.

It can be seen in FIG. 2 that without channel reassignment the performance degrades, since the relay node 10 is not able to match the optimal subcarriers to each other. Rather, in a conventional solution a subcarrier is unusable if one of the (a priori determined) subcarriers (its' input or output channel) experience a poor channel.

It should be noted that in a single-antenna OFDM case the exemplary embodiments of this invention assume a frequency-selective channel. If either the input or output channel is flat, the reassignment may not be effective. However, channels may be defined differently, e.g., in space (with multi-antenna relays), or in time, or in frequency. As such, the exemplary embodiments of this invention are not limited to the example given above (or to its constraints). Intentional randomization may also be used at the relay node 10, or at some other node, to increase the variability of the elements in the assignment matrix. Random beamforming, delay diversity and/or cyclic delay diversity, as three non-limiting examples, may also be used so as to increase the frequency-selectivity.

It should be further noted that the exemplary embodiments of this invention relate as well to multi-hop relaying techniques and systems. In multi-hop systems the relays typically consider a larger number of possible channel pairings or assignments. The assignment problem or sub-channel pairing at any given hop may be computed independently of other hops, or the relays may exchange information, so that a relay can take into account not only the channel of its own input and output channels, but also (at least in part) those of the next relay.

It should be further noted that the exemplary embodiments of this invention also pertain to and encompass the above-described permutation matrix P that associates subcarriers p and p' with one another, as discussed above.

Figure 3:
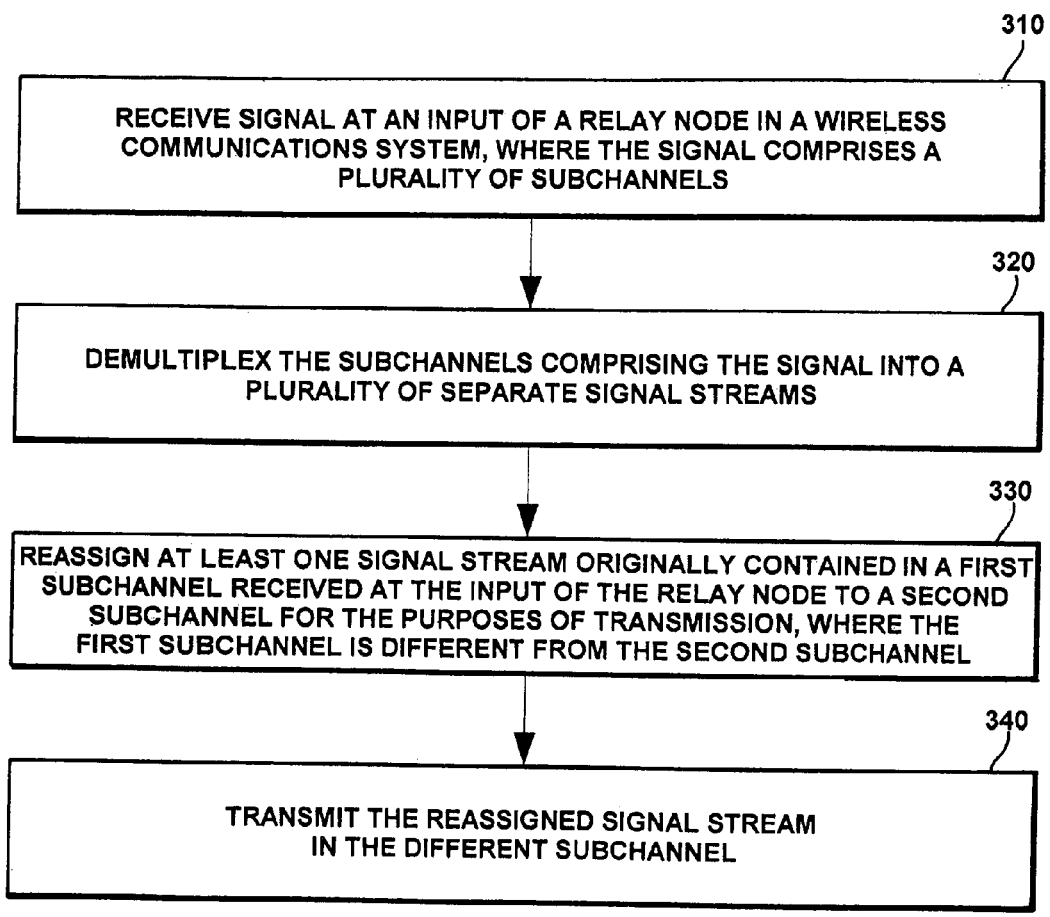
FIG. 3 is a flowchart depicting a method of the invention.
Figure 4:
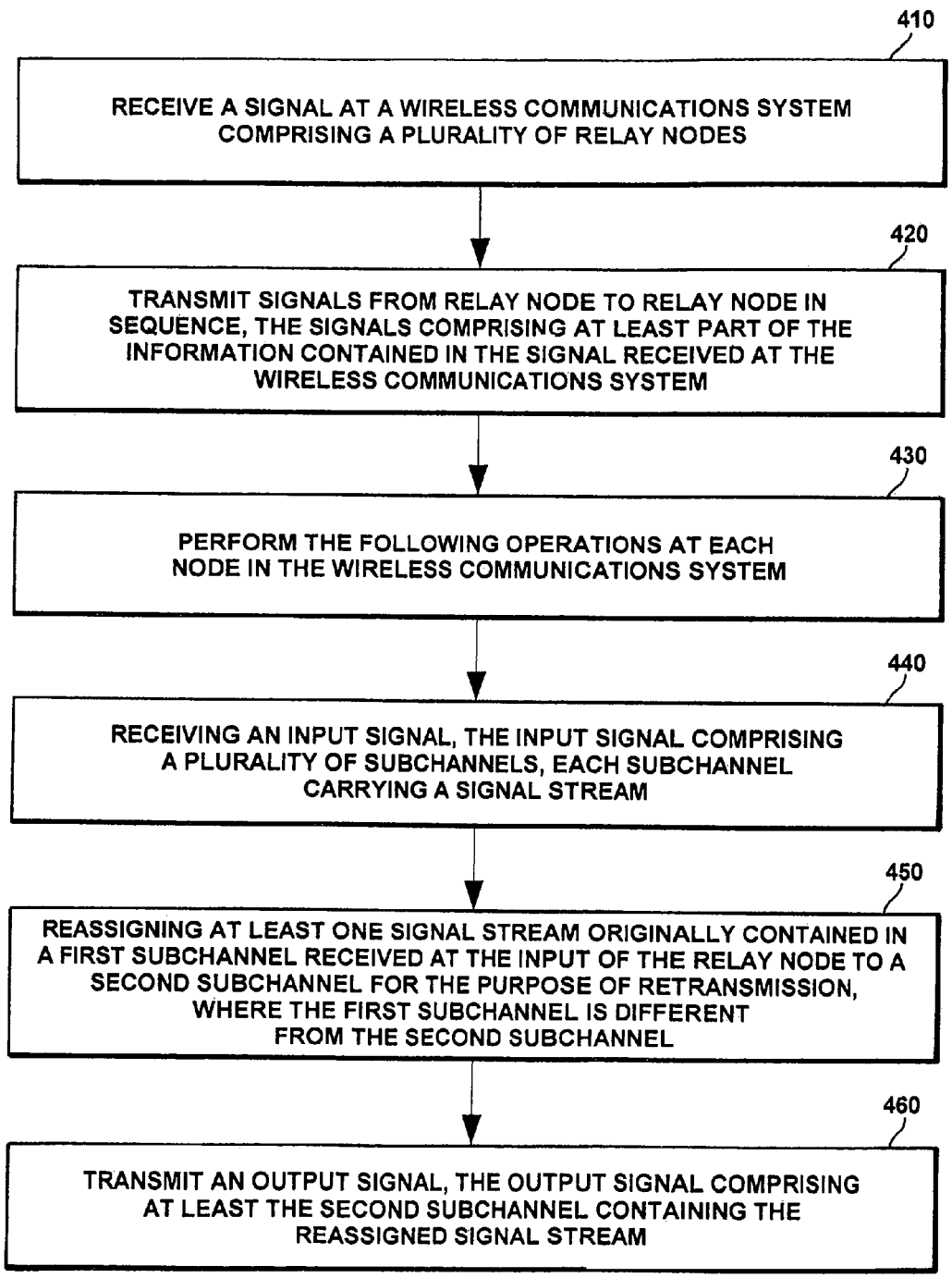
FIG. 4 is a flowchart depicting another method of the invention.

FIGS. 3 and 4 summarize methods operating in accordance with the invention. In a first method, at 310 a signal is received at an input of a relay node in a wireless communications system, where the signal comprises a plurality of subchannels. Next, at 320, the relay node demultiplexes the subchannels comprising the signal into a plurality of separate signal streams. Then, at 330, the relay node reassigns at least one signal stream originally contained in a first subchannel received at the input of the relay node to a second subchannel for the purposes of transmission, where the first subchannel is different from the second subchannel. Next, at 340, the relay node transmits the reassigned signal stream in an output signal containing the second subchannel.

FIG. 4 depicts a method operating in a wireless communications system comprising multiple relay nodes. At 410, a signal is received at the wireless communication system comprising a plurality of relay nodes. Then, at 420, signals are transmitted from relay node to relay node in sequence, the signals comprising at least part of the information contained in the signal received at the wireless communications system. Next, at 430, operations are performed at each node in the wireless communications system. At 440, each node receives an input signal, the input signal comprising a plurality of subchannels, each subchannel carrying a signal stream. Then, at 450 each node reassigns at least one signal stream originally contained in a first subchannel received at the input of the relay node to a second subchannel for the purpose of transmission, where the first subchannel is different from the second subchannel. Next, at 460, each node transmits an output signal, the output signal comprising at least the second subchannel containing the reassigned signal stream.

One skilled in the art will appreciate that the methods, apparatus and computer program products of the invention can be applied to both regenerative and non-regenerative relay nodes. In regenerative relay nodes, an aspect of the signal stream reassigned from one input subchannel to a different output subchannel for the purpose of transmission may be modified prior to transmission. In one exemplary embodiment, the aspect modified prior to transmission may comprise transmission format. The aspect of the transmission format modified prior to transmission may comprise frame structure; symbol encoding; or timing as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As an example, the program (PROG) 18A shown in FIG. 1 may be operable to direct the data processor 16 to operate so as to demultiplex the input sub-channels (e.g., OFDM subcarriers) and reassign at least one symbol stream in at least one input sub-channel to another output sub-channel before transmission, where the transmission sub-channel is different than the input sub-channel. Furthermore, the data processor 16, under direction of the program 18A, may use channel information at the relay node 10 input or output for optimizing the channel reassignment and other resource allocation tasks such as, but not limited to, power/rate/transport format allocation for sub-channels.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. For example, it should be noted that there may be more than one user accessing the same relay node (e.g., two transmitters, one relay, and at least one destination). However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
receiving a signal at an input of a relay node in a communications system, where the signal comprises a plurality of subchannels;
demultiplexing the subchannels comprising the signal into a plurality of separate signal streams;
reassigning at least one signal stream originally contained in a first subchannel received at the input of the relay node to a second subchannel for the purpose of transmission, where the first subchannel is different from the second subchannel, and where reassigning the at least one signal stream comprises using channel information derived from at least one of input subchannels and output subchannels of the relay node; and
transmitting the reassigned signal stream in the second subchannel, where the channel information comprises at least one of power, rate, and transport information from the at least one of the input subchannels and output subchannels of the relay node.

2. A method comprising:
receiving a signal at an input of a relay node in a communications system, where the signal comprises a plurality of subchannels;
demultiplexing the subchannels comprising the signal into a plurality of separate signal streams;
reassigning at least one signal stream originally contained in a first subchannel received at the input of the relay node to a second subchannel for the purpose of transmission, where the first subchannel is different from the second subchannel, and where reassigning the at least one signal stream comprises using channel information derived from at least one of input subchannels and output subchannels of the relay node, and wherein reassigning at least one signal stream further comprises establishing a ranking of input and output subchannels using at least one parameter and reassigning at least some of the signal streams originally contained in input subchannels to different output subchannels using the ranking; and
transmitting the reassigned signal stream in the second subchannel.

3. The method of claim 2 where reassigning at least some of the signal streams contained in the input subchannels to different output channels using the ranking further comprises matching a signal stream contained in a top-ranked input subchannel with a top-ranked output subchannel; matching a signal stream contained in a next-best ranked input subchannel with a next-best ranked output subchannel; and continuing until each of the signal streams to be reassigned have been reassigned.

4. The method of claim 2 where the at least one parameter comprises signal-to-noise ratios of the input or output subchannels.

5. The method of claim 2 where the at least one parameter comprises channel capacity of the input or output subchannels.

6. The method of claim 2 where the at least one parameter comprises mutual information of the input or output subchannels.

7. The method of claim 1 wherein reassigning at least one signal stream further comprises reassigning the at least one signal stream to an output subchannel, wherein the reassignment minimizes probability of error.

8. A method comprising:
receiving a signal at an input of a relay node in a communications system, where the signal comprises a plurality of subchannels;
demultiplexing the subchannels comprising the signal into a plurality of separate signal streams;
reassigning at least one signal stream originally contained in a first subchannel received at the input of the relay node to a second subchannel for the purpose of transmission, where the first subchannel is different from the second subchannel, and where reassigning the at least one signal stream comprises using channel information derived from at least one of input subchannels and output subchannels of the relay node, and wherein reassigning at least one signal stream further comprises reassigning a plurality of signal streams to new output subchannels, wherein the signal streams are reassigned in a manner that average error is minimized; and
transmitting the reassigned signal stream in the second subchannel.

9. The method of claim 1 wherein reassigning at least one signal stream further comprises reassigning a plurality of signal streams using an optimization technique.

10. The method of claim 9 where the optimization technique maximizes received signal strength.

11. The method of claim 9 where the optimization technique improves received signal strength over an original assignment.

12. The method of claim 9 wherein the optimization technique solves an assignment problem.

13. The method of claim 12 where permutation matrices are used to solve the assignment problem, wherein the permutation matrices represent various combinations of input subchannels with output subchannels.

14. The method of claim 1 where the communications system is a wireless communications system.

15. The method of claim 14 where the wireless communications system comprises an orthogonal frequency division multiplexing system and the subchannels correspond to orthogonal frequency division multiplexing subcarriers.

16. The method of claim 14 where the wireless communications system comprises a code division multiple access system and the subchannels correspond to separately-encoded Walsh codes.

17. The method of claim 14 where the relay node further comprises a multi-antenna array and the subchannels are defined in space for the multi-antenna array.

18. The method of claim 1 further comprising defining subchannels in such a way to increase frequency selectivity in the input and output subchannels.

19. The method of claim 1 further comprising:
prior to transmitting an output signal comprising at least the reassigned signal stream contained in the second subchannel, modifying the output signal at the relay node using at least one of random beamforming; delay diversity; and cyclic delay diversity.

20. The method of claim 1 where the relay node further comprises a non-regenerative relay.

21. The method of claim 20 where the operations further comprise:

prior to transmitting the reassigned signal stream in the second subchannel, modifying at least one aspect of the reassigned signal stream, wherein the aspect is one of amplitude; and timing.

22. The method of claim 1 where the relay node further comprises a regenerative relay.

23. The method of claim 22 where the operations further comprise:
prior to transmitting the at least one signal stream in the second subchannel, modifying an aspect of the at least one signal stream.

24. The method of claim 23 where the aspect of the at least one signal stream being modified comprises at least one of transmission power; transmission format; frame structure; signal encoding; signal timing; amplitude; and rate.

25. An apparatus comprising:
at least one processor; and
at least one memory including computer program code, where the at least one memory and the computer program code are configured, with the at least one processor, to cause the apparatus to at least:
receive an input signal comprised of a plurality of subchannels;
transmit an output signal comprised of a plurality of subchannels; and
demultiplex the subchannels comprising the input signal into a plurality of separate signal streams;
reassign at least one signal stream originally contained in a first subchannel received at the apparatus to a second subchannel for the purpose of transmission, where reassigning the at least one signal stream comprises using channel information derived from at least one of input subchannels and output subchannels of the apparatus; and
transmit the output signal, the output signal comprising at least the second subchannel containing the reassigned signal stream, where the channel information comprises at least one of power, rate, and transport information from the at least one of the input subchannels and output subchannels of the apparatus.

26. An apparatus comprising:
at least one processor; and
at least one memory including computer program code, where the at least one memory and the computer program code are configured, with the at least one processor, to cause the apparatus to at least:
receive an input signal comprised of a plurality of subchannels;
transmit an output signal comprised of a plurality of subchannels; and
demultiplex the subchannels comprising the input signal into a plurality of separate signal streams;
reassign at least one signal stream originally contained in a first subchannel received at the apparatus to a second subchannel for the purpose of transmission, where reassigning the at least one signal stream comprises using at least channel information derived from at least one of input subchannels and output subchannels of the apparatus, and where the reassigning further comprises establishing a ranking of input and output subchannels using at least one channel parameter, and reassigning at least some of the signal streams contained in the input subchannels to different output subchannels using the ranking; and
transmit the output signal, the output signal comprising at least the second subchannel containing the reassigned signal stream.

27. The apparatus of claim 26 where the computer program code is further configured, with the at least one processor, to cause the apparatus to match a signal stream contained in a top-ranked input subchannel with a top-ranked output subchannel; to match a signal stream contained in a next-best ranked input subchannel with a next-best ranked output channel; and to continue until each of the signal streams to be reassigned have been reassigned.

28. The apparatus of claim 26 where the at least one channel parameter comprises signal-to-noise ratios of the input or output subchannels.

29. The apparatus of claim 26 where the at least one channel parameter comprises channel capacity of the input or output subchannels.

30. The apparatus of claim 26 where the at least one channel parameter comprises mutual information of the input or output subchannels.

31. The apparatus of claim 25 where the computer program code is further configured, with the at least one processor, to cause the apparatus to minimize probability of error wherein performing reassignment of the at least one signal stream from the first subchannel to the second subchannel.

32. An apparatus comprising:
at least one processor; and
at least one memory including computer program code, where the at least one memory and the computer program code are configured, with the at least one processor, to cause the apparatus to at least:
receive an input signal comprised of a plurality of subchannels;
transmit an output signal comprised of a plurality of subchannels; and
demultiplex the subchannels comprising the input signal into a plurality of separate signal streams;
reassign at least one signal stream originally contained in a first subchannel received at the apparatus to a second subchannel for the purpose of transmission, where reassigning the at least one signal stream comprises using channel information derived from at least one of input subchannels and output subchannels of the apparatus, and where the reassigning further comprises reassigning a plurality of signal streams from input subchannels to different output subchannels, where the signal streams are reassigned in a manner to minimize average error during the reassignment; and
transmit the output signal, the output signal comprising at least the second subchannel containing the reassigned signal stream.

33. The apparatus of claim 25 where the reassignment circuitry is further configured to use an optimization technique during the reassignment.

34. The apparatus of claim 33 where the optimization technique maximizes received signal strength.

35. The apparatus of claim 33 where the optimization technique improves received signal strength in comparison to an original subchannel assignment.

36. The apparatus of claim 25 where the apparatus is configured for use in an orthogonal frequency division multiplexing telecommunications system and the subchannels correspond to orthogonal frequency division multiplexing subcarriers.

37. The apparatus of claim 25 where the apparatus is a non-regenerative relay node.

38. The apparatus of claim 37 further comprising the computer program code is configured, with the at least one processor, to cause the apparatus to amplify the at least one signal stream prior to transmission.

39. The apparatus of claim 25 where the apparatus is a regenerative relay node.

40. The apparatus of claim 39 further comprising the computer program code is configured, with the at least one processor, to cause the apparatus to modify an aspect of the at least one signal stream prior to transmission.

41. The apparatus of claim 40 where the aspect comprises transmission format of the at least one signal stream.

42. A relay node comprising:
  receiver means for receiving an input signal comprised of a plurality of subchannels;
  transmitter means for transmitting an output signal comprised of a plurality of subchannels; and
  signal processing means coupled to the receiver means and the transmitter means, the signal processing means further comprising demultiplexing means for demultiplexing the subchannels comprising the input signal into a plurality of separate signal streams;
  reassignment means for reassigning at least one signal stream originally contained in a first subchannel received at the relay node to a second subchannel for the purpose of transmission, where reassigning the at least one signal stream comprises using channel information derived from at least one of input subchannels and output subchannels of the relay node; and
  transmission control means for causing the transmitter means to transmit the output signal, the output signal comprising at least the second subchannel containing the reassigned at least one signal stream, where the channel information comprises at least one of power, rate, and transport information from the at least one of the input subchannels and output subchannels of the relay node.

43. A non-transitory computer readable medium tangibly embodying a program of machine-readable instructions executed by a digital processing apparatus of a computer system to perform operations comprising:
  receiving, at a network node, an input signal comprised of a plurality of subchannels;
  demultiplexing the subchannels creating a plurality of separate signal streams;
  reassigning at least one signal stream originally contained in a first subchannel to a second subchannel for the purpose of transmission, wherein the first subchannel is different from the second sub-channel, and where reassigning the at least one signal stream comprises using channel information derived from at least one of input subchannels and output subchannels of the network node; and
  issuing a command to transmit an output signal comprising at least the second subchannel containing the reassigned signal stream, where the channel information comprises at least one of power, rate, and transport information from the at least one of the input subchannels and output subchannels of the network node.

44. A method comprising:
  receiving a signal in a wireless communication system comprised of a plurality of relay nodes;
  transmitting signals from relay node to relay node in sequence, the signals comprising at least part of the information contained in the signal received at the wireless communications system; and
  at each relay node in the sequence:
    receiving an input signal, the input signal comprising a plurality of subchannels, each subchannel carrying a signal stream;
    reassigning at least one signal stream originally contained in a first subchannel received at the input of the relay node to a second subchannel for the purpose of transmission, where the first subchannel is different from the second subchannel, and where reassigning the at least one signal stream comprises using channel information derived from at least one of input subchannels and output subchannels of a relay node; and
    transmitting an output signal, the output signal comprising at least the second subchannel containing the reassigned signal stream, where the channel information comprises at least one of power, rate, and transport information from the at least one of the input subchannels and output subchannels.

* * * * *